Figure 1:
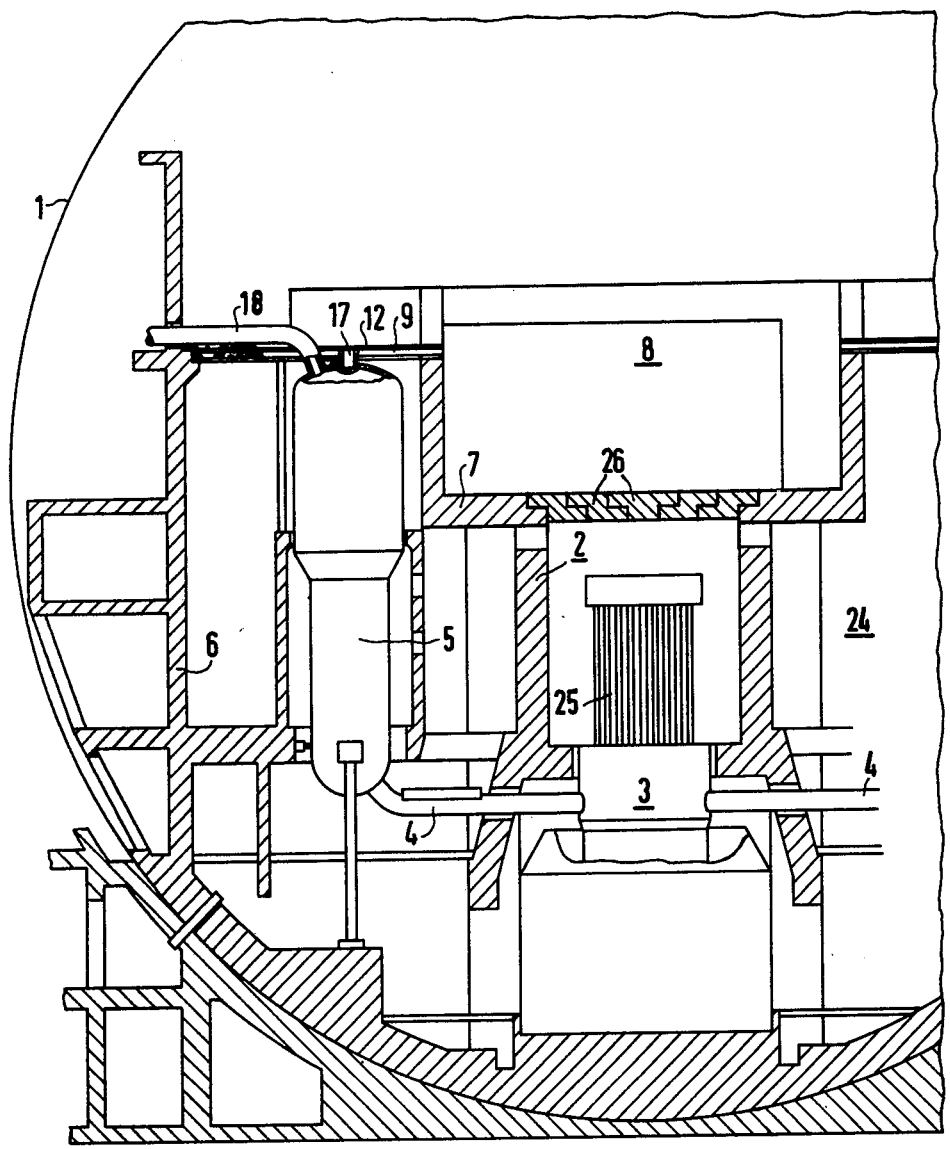

United States Patent [19]

Haidlen

[11] 4,131,509
[45] Dec. 26, 1978

[54] PRESSURE RELIEF DEVICE FOR A NUCLEAR REACTOR CONTAINMENT BUILDING

[75] Inventor: Friedrich Haidlen, Erlangen, Germany

[73] Assignee: Kraftwerk Union Aktiengesellschaft, Mülheim (Ruhr), Germany

[21] Appl. No.: 669,920

[22] Filed: Mar. 24, 1976

[30] Foreign Application Priority Data

Mar. 27, 1975 [DE] Fed. Rep. of Germany ....... 2513822

[51] Int. Cl.² ............................................... G21C 9/00
[52] U.S. Cl. ......................................... 176/38; 176/87
[58] Field of Search ............................. 176/37, 38, 87

[56] References Cited

U.S. PATENT DOCUMENTS

| 3,207,671 | 9/1965 | Kornbichler | 176/38 |
| 3,937,651 | 2/1976 | Schabert et al. | 176/38 |

FOREIGN PATENT DOCUMENTS 1208017 12/1965 Fed. Rep. of Germany ............. 176/38

Primary Examiner—Samuel W. Engle
Assistant Examiner—Ralph Palo
Attorney, Agent, or Firm—Herbert L. Lerner

[57] ABSTRACT

A reactor building has equipment rooms wherein a nuclear reactor, steam generators and circulating pumps are disposed, and has operating rooms separated from the equipment rooms by ceilings and walls largely formed of concrete and provided with relief openings for reducing differential pressures during a reactor accident, the relief openings being formed in a grid-shaped steel girder construction carrying a flat tight skin, the steel girder construction has gratings at the upper side thereof formed with a narrow mesh capable of being walked upon, and having said tight skin at the underside thereof in the form of a multiplicity of casette-shaped membranes suspended therefrom.

7 Claims, 3 Drawing Figures

PRESSURE RELIEF DEVICE FOR A NUCLEAR REACTOR CONTAINMENT BUILDING

The invention relates to a reactor building having equipment rooms containing a nuclear reactor, especially a pressurized water reactor, steam generators and circulating pumps and operating rooms separated from the equipment rooms by ceilings or roofs and walls largely formed of concrete and having relief openings formed therein for reducing differential pressures during an accident, the relief openings being provided in a grid-shaped steel girder construction and a flat tight skin or shell carried thereby.

In German Published Prosecuted Application DT-AS 2 125 158, a reactor building is disclosed having a tight skin or shell which is to ensure a substantially gas-tight closure or seal between the reactor equipment rooms, on the one hand, and operating rooms, on the other hand, during normal operation of the reactor, the tight skin being formed of flat plates disposed on the steel girder construction. If excess pressure is produced, the plates are supposed to swing upwardly or outwardly like articulatingly mounted flaps. The articulating mounting can also be achieved by a one-sided stressing of the plates because, in the case of large-area plates, slight excess pressures are sufficient to provide the forces necessary for opening the plates.

It is an object of the invention to provide a reactor building of the foregoing general type with more advantageous means than heretofore in order to achieve large-area relief of the equipment rooms in the case where an escape of reactor coolant occurs, so as to produce, advantageously, lower excess pressures. More specifically, it is an object of the invention to increase the reliability or safety of the reactor because the plates conventionally employed heretofore as a bearing surface, not only require considerable space above the roof or ceiling during the response of the relief device to excess pressure, but also reduce, in an uncontrollable manner, the ability of walking on the roof or ceiling.

With the foregoing and other objects in view, there is provided, in accordance with the invention, a reactor building having equipment rooms wherein a nuclear reactor, steam generators and circulating pumps are disposed, and having operating rooms separated from the equipment rooms by ceilings and walls largely formed of concrete and provided with relief openings for reducing differential pressures during a reactor accident, the relief opening being formed in a grid-shaped steel girder construction carrying a flat tight skin, the steel girder construction having gratings at the upper side thereof formed with a narrow mesh capable of being walked upon, and having the tight skin at the underside thereof in the form of a multiplicity of cassette-shaped membranes suspended therefrom. Thereby, even when the relief device responds or reacts to excess pressure that has developed, no direct danger to any devices located on the steel girder construction exists. The tight skin in the form of cassette-shaped membranes can open without causing any disturbances to any parts thereof located above the steel girder construction. Moreover, the steel girder construction may be walked upon in a conventional manner even after the response or reaction to excess pressure, because the ability to walk thereon is assured due to the narrow-mesh gratings.

The device of the invention of the instant application is not comparable to a conventional intermediate ceiling in a boiling water reactor such as is disclosed in German Published Prosecuted Application DT-AS 1 208 017 wherein a condensation chamber located above the reactor pressure vessel is constructed with the aid of foils which form a tight partition in the interior of the containment vessel, the foils being fixed between gratings and so supported that the space above the foils can be filled with water. There is, of course, no discussion in the last-mentioned German published application of ability to walk thereon. Moreover, the mass movement of inertia of the water supported on the tight skin hampers the rapid response of the pressure relief, as is shown in German Published Prosecuted DT-AS 1 142 041, in the middle of column 3 thereof.

In accordance with another feature of the invention, the membranes form cassette-like subdivisions of the tight skin, each of the subdivisions being smaller or having outer dimensions that are smaller than those of the gratings. In other words, the area of the individual cassette-like membranes or flat box-like panels is smaller than the area of the gratings, which assure that the steel girder construction can be walked upon. Moreover, the gratings assumed to be walked upon, for their part, naturally have a small grid division of several centimeters which is conventional for such gratings. The dimensions of the cassette division are multiples with respect to the grid division. It should also be noted that the cassette division need not necessarily be determined by the presence of a frame for fastening the tight skin, but rather can also result from individual points of attachment.

In accordance with a further feature of the invention, the cassette-shaped membranes at the edge of the tight skin are connected to folding bellows serving as sealing means. Such folding bellows, which afford a given mobility, are especially advantageous when provided at locations at which parts having greatly different temperatures are located, for example, in the environment or vicinity of a steam line extending through the tight skin, because marked thermal expansions can occur there due to the difference between room temperature of about 20° C. and operating temperature of about 250° C. or more.

In accordance with an added feature of the invention, the gratings and the membranes are spaced apart a distance equal to about half or more of the division or length of the cassette-like membrane. This spacing assures that membranes torn open during the formation of excessive pressure will not strike against the gratings nor will they reduce the cross section of the relief opening by abutting against the gratings when only partly torn loose.

In accordance with an additional feature of the invention, the membranes are formed with defined weak spots therein, for example along the direction of restraint thereof or in a cruciform pattern. The provision of such weak spots permits the response pressure i.e. the pressure at which the membranes will give way, to be lower than otherwise, and additionally assures that the membranes will be torn up by the excess pressure in a more definite manner so that fragments of controllable size will be produced.

In accordance with yet another feature of the invention, the steel girder construction is connected at nodal points or joints to a support construction for a component of the primary coolant circulatory system such as steam generators and/or circulating pumps disposed below the membranes. The steel girder construction then serves also for supporting the aforementioned components without any weight being applied by the latter to the sealing membranes per se.

In accordance with a concomitant feature of the invention, a support for steam lines is provided fastened to the steel girder construction, the steam lines extending through individual membranes and individual gratings. The steel grider construction thus further serves as a structural element of the primary coolant circulatory loop of the reactor installation, so that economies are afforded due to the many-faceted functions thereof.

Other features which are considered as characteristic for the invention are set forth in the appended claims.

Although the invention is illustrated and described herein as embodied in reactor building for a nuclear reactor, it is nevertheless not intended to be limited to the details shown, since various modifications and structural changes may be made therein without departing from the spirit of the invention and within the scope and range of equivalents of the claims.

Figure 2:
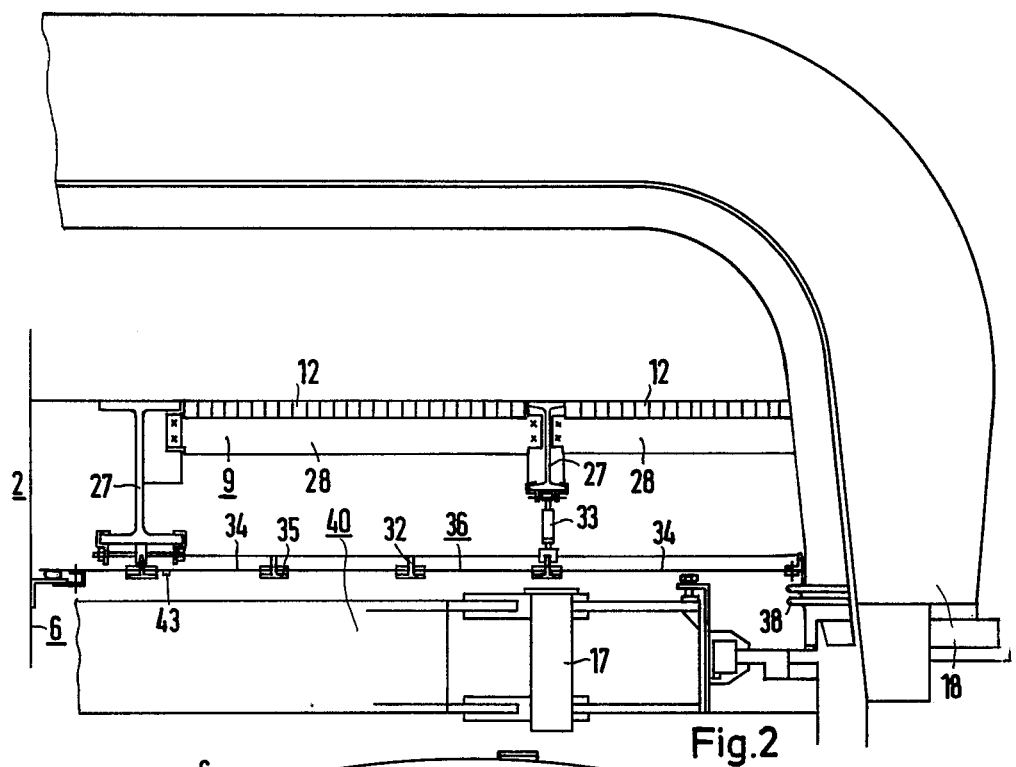
Figure 3:
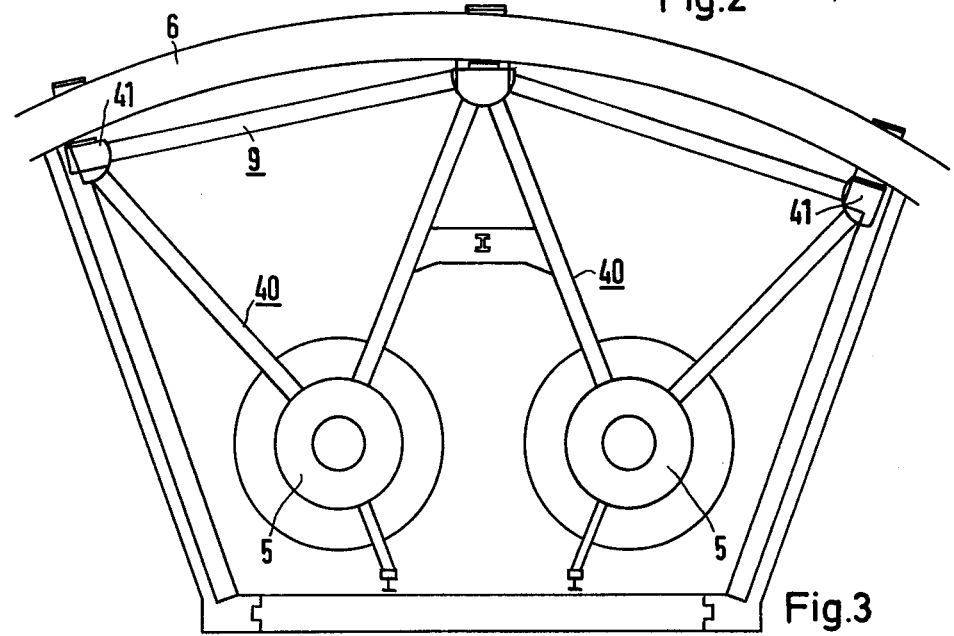

The construction and method of operation of the invention, however will be best understood from the following description of specific embodiemnts when read in connection with the accompanying drawing, in which:

FIG. 1 is a fragmentary cross-sectional view of a pressurized water nuclear reactor installation incorporating the invention of the instant application;

FIG. 2 is a much enlarged fragmentary elevational view of FIG. 1 showing details of the ceiling or roof construction formed of gratings or gridwork and tight shell or skin; and FIG. 3 is an enlarged fragmentary top plan view of FIG. 1 with the outer containment vessel and the tight shell roof or ceiling construction removed and showing the combination of the steel girder construction with a support for components of the primary circulatory loop of the reactor.

Referring now to the drawing and first, particularly, to FIG. 1 thereof, there is shown therein a pressurized water reactor installation in general conformity with the reactor disclosed in German Published Prosecuted Patent Application DT-AS 2 125 158, for 1000 MWe (electrical megawatts). The reactor installation has a spherical steel containment shell 1 in which a concrete structure or building generally identified by the reference numeral 2 is disposed. The concrete building encompasses so-called equipment rooms 24 containing components of the primary circulatory loop of the reactor which includes a reactor pressure vessel 3 containing control rod drives 25. In the reactor pressure vessel 3, coolant heated by the reactor is fed through primary coolant lines 4 to a plurality of steam generators 5 uniformly distributed about the pressure vessel 3 (note FIG. 3), in the interest of clarity only one of the steam generators 5 being shown in FIG. 1.

Since all of the components of the primary circulatory loop of the reactor exhibit relatively strong radiation, the equipment rooms 24 are "off-limits" or non-available to personnel during the operation of the reactor.

The outer limit or boundary of the equipment rooms 24 in lateral direction is defined by a concrete cylinder 6. The equipment rooms 24 are closed at the top thereof by a concrete ceiling or roof 7 which is formed of concrete tie-beams 26 above the reactor pressure vessel 3 in the interest of obtaining accessibility thereto. The concrete is so thick on all sides of the equipment rooms 24 that adequate protection against radiation is afforded thereby. The part of the interior of the steel sphere 1 located above the equipment chambers 24 as well as the space between the steel sphere 1 and the cylinder 6 form the so-called operating rooms 8, occupancy of which is permissible even during operation of the reactor.

A steel girder construction 9 is provided in the vicinity of the upper side of the steam generator 5. The steam generator 5 is supported with fastening means 17 to the steel girder construction 9, which is simultaneously made permeable or penetrable and capable of being walked on, while the live steam lines 18 extend through the steel girder construction 9 serving as a relief opening.

FIG. 2 shows the steel girder construction 9 as being built up of double-T girders 27 which absorb mechanical loads or stresses and are supported in a suitable conventional manner on the concrete structure or building 2. The double-T girder 27, for its part, is connected with small girders 28 so that a very fine subdivision is produced. Bearing surfaces for individual bar grids or gratings 12 which ensure the ability of walking the steel girder construction 9 are thereby attained. The gratings 12 have a grid or grating division of a few centimeters so that walking thereon is possible with ordinary footwear.

A metal frame 32 assembled of L-profiled bars, for example, is fastened to the underside of the girders 27 and 28, suspendable therefrom through adjustable intermediate parts or connectors 33. The frame 32 forms the support or bearing for cassette or box-shaped subdivided or compartmented membranes 34 which are tightly clamped to the frame 32 with the aid of seals 35. The membranes 34, taken together, thereby form a dense or tight shell or skin 36, which extends from the wall 6 of the reactor building up to the adjacent walls. Because of space limitations, this is not fully illustrated in FIG. 2. It is noted, moreover, that the dense or tight skin or shell 36 is tightly fastened to a metal bellows 38 in the vicinity of the live steam line 18 which extends from the steam generator 5 (see FIG. 1).

A support construction 40 is disposed below the dense skin 36. The support construction 40, as shown in FIG. 3, is connected at nodal points or joints 41 to the steel girder construction 9. A rigid support for the steam generator 5 is thereby provided at relatively low cost.

It is readily apparent from FIG. 2 that the spacing between the dense skin 36 and the bar grids or gratings 12 that are walkable on is substantially as large as the cassette divisions. Therefore, the parts of the membranes 34 are precluded from striking against the bar grids or gratings 12 from below when they are broken or forced open i.e. when they open the relief openings, and from clogging or reducing the relief cross section formed by the bar grids or gratings 12.

Furthermore, FIG. 2 shows that the cassette division is smaller than the dimensions of the bar grids or gratings 12 given by the length of the girders 28. The membranes 34 are therefore small and light parts, which are responsive to a relatively slight response pressure. If necessary, this response pressure can be reduced by providing defined weak spots, such as grooves 43 formed at the edge of the frame 32, so that the membranes 34 will break apart more readily at the grooves under the action of a lower excess pressure.

There are claimed:

1. In a reactor building having equipment rooms wherein a nuclear reactor, steam generators and circulating pumps are disposed, and having operating rooms separated from the equipment rooms by ceilings and walls largely formed of concrete and provided with relief openings for reducing differential pressures during a reactor accident, the relief openings being formed in a grid-shaped steel girder construction carrying a flat tight skin destructible at a given pressure produced during a reactor accident, the steel girder construction having gratings at the upper side thereof formed with a narrow mesh capable of being walked upon during operation of the reactor, and having said tight skin at the underside thereof in the form of a multiplicity of cassette-shaped membranes suspended therefrom and spaced from the gratings.

2. Reactor building according to claim 1 wherein the cassette-shaped membranes at the edge of said tight skin are connected to folding bellows serving as sealing means.

3. Reactor building according to claim 1 wherein said membranes form cassette-like subdivisions of said tight skin having outer dimensions smaller than those of said gratings.

4. Reactor building according to claim 3 wherein said gratings and said membranes are spaced apart a distance equal to at least half the length of a cassette-like subdivision.

5. Reactor building according to claim 1 wherein said membranes are formed with defined weak spots therein.

6. Reactor building according to claim 1 including a support construction for components of the primary coolant circulatory system located below said membranes, said steel girder construction being connected at nodal points thereof to said support construction.

7. Reactor building according to claim 1 including a support for steam lines fastened to the steel girder construction, the steam lines extending through individual membranes and individual gratings.

* * * * *